United States Patent [19]

Bryansky et al.

[11] 4,277,085
[45] Jul. 7, 1981

[54] TRANSPORT VEHICLE

[76] Inventors: Jury A. Bryansky, Leningradskoe shosse, 61-63, kv. 67; Stanislav B. Gess de Kalve, ulitsa Fersmana, 11, kv. 13; Igor V. Ermilin, Brigadirsky pereulok, 3-5, kv. 92, all of Moscow, U.S.S.R.

[21] Appl. No.: 964,501

[22] Filed: Nov. 29, 1978

[30] Foreign Application Priority Data

| Nov. 30, 1977 | [SU] | U.S.S.R. | 2546950 |
| Apr. 28, 1978 | [SU] | U.S.S.R. | 2611956 |
| May 30, 1978 | [SU] | U.S.S.R. | 2621560 |
| May 31, 1978 | [SU] | U.S.S.R. | 2624801 |
| Jun. 8, 1978 | [SU] | U.S.S.R. | 2624401 |
| Sep. 26, 1978 | [SU] | U.S.S.R. | 2662301 |

[51] Int. Cl.³ .............................................. B62D 7/00
[52] U.S. Cl. ..................................... 280/660; 280/104
[58] Field of Search .................. 280/112 A, 660, 673, 280/661, 104, 682

[56] References Cited

U.S. PATENT DOCUMENTS

| 1,427,240 | 8/1922 | Stanfield | 280/104 |
| 2,137,848 | 11/1938 | MacBeth | 280/104 |
| 2,152,938 | 4/1939 | Welch | 280/112 A |
| 2,802,674 | 8/1957 | Jackson | 280/112 A |
| 2,941,815 | 6/1960 | Müller | 280/112 A |
| 2,950,122 | 8/1960 | Erickson | 280/104 |
| 4,089,384 | 5/1978 | Erenberg | 280/660 |
| 4,153,265 | 5/1979 | McColl | 280/112 A |
| 4,223,910 | 9/1980 | Fry | 280/660 |

FOREIGN PATENT DOCUMENTS 574955  7/1924  France ..................................... 280/104

Primary Examiner—John P. Silverstrim
Assistant Examiner—Norman L. Stack, Jr.
Attorney, Agent, or Firm—Lackenbach, Lilling & Siegel

[57] ABSTRACT

A vehicle comprising a sprung mass and unsprung masses, front and rear suspensions coupling said sprung mass through said unsprung masses so that said unsprung masses can move independently in a vertical direction with respect to said sprung mass. Each of said suspensions comprising a resilient element and levers, the ends of which are hingedly connected to an unsprung mass while their other ends are connected to said sprung mass. A unit for said resilient elements is arranged on said sprung mass; and a plurality of flexible elements, each coupling said unit for said resilient elements with an unsprung mass. The flexible elements are under tension in the entire range of the vertical movement of an unsprung mass with respect to said sprung mass due to pretightening of the resilient elements.

13 Claims, 11 Drawing Figures

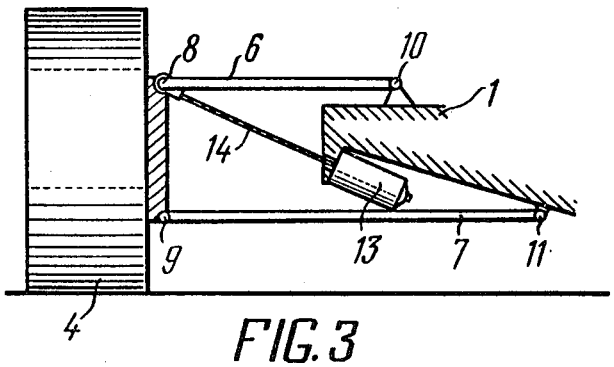
FIG. 3
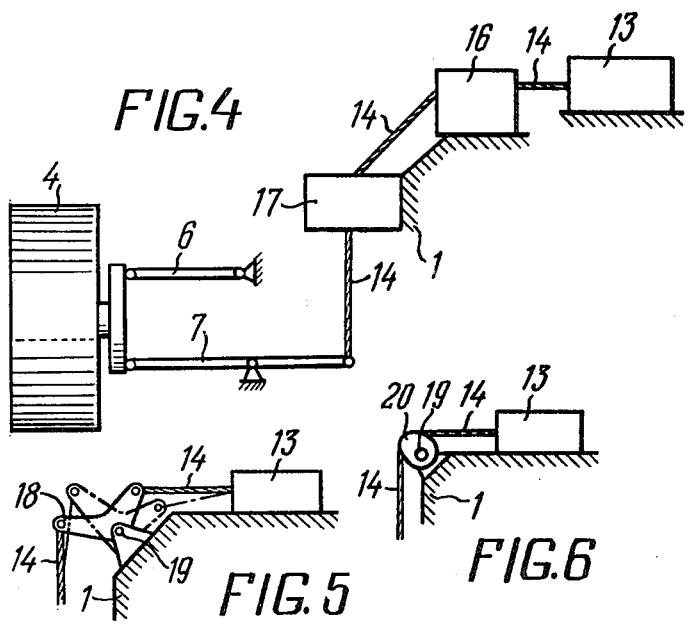
FIG. 4
FIG. 5
FIG. 6

TRANSPORT VEHICLE

BACKGROUND OF THE INVENTION

This invention relates to railless means of land transport. It can be used with particular advantage in the construction of wheeled vehicles having sprung and unsprung masses. It can also be used in the construction of track-laying vehicles having a spring-assisted suspension system.

Well known in the art are motor vehicles, or automobiles, wherein the suspension of each unsprung mass (wheel) comprises arms, the ends of which are articulated to the unsprung and sprung masses, and a resilient element comprising a shock absorber and a spring located between one of said arms and the sprung mass and articulated thereto. The resilient element resists the relative movement of the unsprung mass and decreases the oscillations involved. With this location of the resilient element, a part of its mass pertains to the unsprung mass.

When such a suspension is employed in a racing car, the location of the resilient element between one of the suspension arms and the sprung mass impairs the aerodynamical properties of the vehicle with a consequent increase in drag.

The suspension arm connected to the resilient element is subjected to bending and, therefore, its mass needs to be increased. Another disadvantage resulting from the aforementioned location of the resilient element is that removal of the resilient element necessitates a partial disassembly of the suspension with a consequent complication of the vehicle servicing.

SUMMARY OF THE INVENTION

It is an object of the present invention to provide a vehicle wherein the suspension of the unsprung masses is constructed in such a manner as to decrease said unsprung masses.

It is a further object of the invention to improve the aerodynamic properties of the vehicle.

It is a still further object of the invention to facilitate installation and removal of the resilient elements in servicing the vehicle.

These and other objects are achieved by providing a vehicle wherein the suspension of each unsprung mass comprises arms articulated at one end to the unsprung mass and at the other end to the sprung mass of the vehicle, and a resilient element mechanically connected to the sprung and unsprung masses. According to the invention, the resilient element is located on the sprung mass and the mechanical connection to the unsprung mass is effected through the use of a flexible element.

It is desirable that one end of the flexible element be connected to the resilient element and the other end thereof to one of the suspension arms.

It is further desirable that one end of the flexible element be connected to the unsprung mass and the other end thereof to the resilient element.

Connecting the flexible element in such a manner relieves the arms of bending stresses, thereby permitting the mass of the arms to be decreased.

It is still further desirable that between the unsprung mass and the resilient element provision be made of a device arranged to vary the direction and magnitude of the stress in the flexible element, adapted to interact with the latter and mounted on the sprung mass.

It is possible that the device for varying the direction and magnitude of the stress in the flexible element be constructed in the form of a bellcrank lever with arms of different length and the flexible element be divided into two pieces, the ends of the flexible element pieces at the point of division being connected to the arms of the bellcrank lever.

It is also possible that the device for varying the direction and magnitude of the stress in the flexible element be constructed in the form of an appropriately contoured roller arranged for the flexible element to run over it and eccentrically pivot on the sprung mass.

The employment of such devices makes it possible to locate the resilient elements in any convenient place on the sprung mass, simplifying the arrangement of the other vehicle components. Further, the use of such devices makes it possible to provide, depending upon the conditions, of movement, the desirable suspension characteristic with practically any characteristic of the resilient element.

It is desirable that the resilient elements be arranged in close proximity to one another in one unit mounted on the sprung mass.

The arrangement of the resilient elements in a unit further simplifies their installation and removal.

It is also desirable that the vehicle have a roll stabilizer mounted on the sprung mass constructed in the form of a torsion bar with two arms positioned at an angle thereto, and the ends of said torsion bar arms being connected to the resilient elements of the suspension carrying coaxial unsprung masses.

It is possible that the vehicle may be provided with a pitch stabilizer mounted on the sprung mass and constructed in the form of a torsion bar with two arms positioned at an angle thereto, with the ends of said torsion bar arms being connected to the resilient elements of the suspensions situated on the same side of the vehicle.

By connecting the roll and pitch stabilizers to the resilient elements, they can be of comparatively small size and the sprung mass can be relieved of torsional loads with a resultant decrease of the sprung mass.

It is also possible that at least one of the resilient elements may be a common element for at least two unsprung masses connected thereto through flexible elements.

The use of one resilient element for two unsprung masses makes it possible to decrease the quantity of the resilient elements and, consequently, simplify the construction of the suspension.

It is very desirable that the vehicle have a system designed for controlling the relative positions of the sprung and unsprung masses, the system being mounted on the sprung mass and comprising pickups for sensing the relative positions of the sprung mass and the respective unsprung masses, a unit for amplifying and converting signals from said pickups, the inputs of said unit being connected to the outputs of said pickups, a manual master control unit having its output connected to the appropriate input of the amplifying and converting unit, and a drive whose input is connected to the output of the amplifying and converting unit, whereas the output of said drive is connected to the input of a servomechanism arranged to interact with the resilient elements.

The provision of such a control system enables the vehicle to maintain a desired ground clearance irrespective of variation in the sprung mass and aerodynamic forces during movement.

It is further desirable that each pair of the coaxial unsprung masses be provided with a common pickup for sensing the relative positions of the sprung and unsprung masses, said pickup being connected to the flexible elements connecting said unsprung masses to the resilient elements.

It is possible that the system for controlling the relative positions of the sprung and unsprung masses should comprise roll and pitch pickups mounted on the sprung mass, the outputs of said pickups being connected to the inputs of the unit amplifying and converting signals from the pickups sensing the relative positions of the unsprung masses.

The employment of roll and pitch pickups in the control system makes it possible to eliminate mechanical roll and pitch stabilizers and enables the driver to vary at will the pitch and roll rates of the suspension to suit various travel conditions.

The vehicle constructed according to this invention has comparatively small unsprung masses, a decreased sprung mass, improved aerodynamic properties and a better general arrangement wherein the resilient elements are located in a convenient place on the sprung mass and can be installed and removed without disassembling the suspension.

In this vehicle, expedient suspension rates can be obtained to suit travel conditions, with any characteristics of the resilient elements being used.

BRIEF DESCRIPTION OF THE DRAWINGS

Now the invention will be described in detail with reference to the accompanying drawings in which:

FIG. 3 is another diagrammatic view of the same, with the end of the flexible element attached to the unsprung mass.

FIG. 4 is a further diagrammatic view of the same, showing a device for varying the direction and magnitude of the stress in the flexible element.

FIG. 5 shows a device for varying the direction and magnitude of the stress in the flexible element with the device shown constructed in the form of a bellcrank lever.

FIG. 6 shows the same device as that of FIG. 5, but constructed in the form of a contoured roller.

DESCRIPTION OF THE PREFERRED EMBODIMENTS

Figure 1:
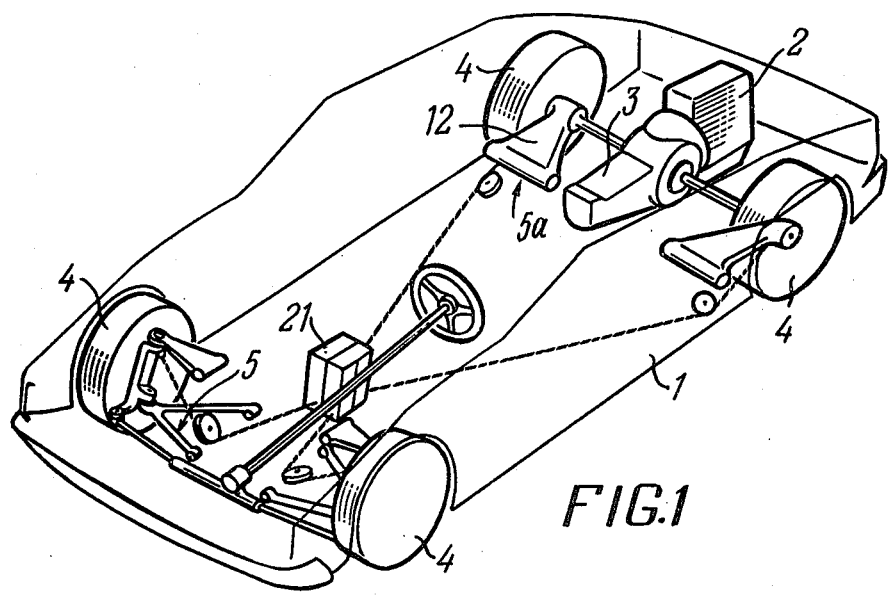
FIG. 1 is a diagrammatic view of a wheeled vehicle chassis with a suspension constructed according to the invention.

The vehicle has a chassis comprising a sprung mass 1 (FIG. 1) on which are mounted an engine 2, a transmission 3 and unsprung masses 4, such as wheel units or the like, which are connected to the sprung mass 1 by means of front suspensions 5 and rear suspensions 5a.

Figure 2:
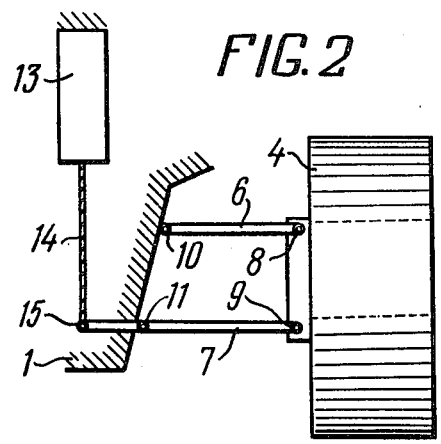
FIG. 2 is a diagrammatic view of the suspension of one of the unsprung masses wherein the end of the flexible element is attached to one of the suspension arms.

In this embodiment of the invention, the suspension 5 of each front unsprung mass 4 comprises an upper arm 6 (FIG. 2) and a lower arm 7. The ends of said arms are connected to the unsprung mass 4 by articulated joints 8 and 9 and to the sprung mass by articulated joints 10 and 11. The rear suspension 5a of each rear unsprung mass 4 comprises a longitudinal pivoted arm 12. Other types of linkage can also be used for this purpose.

The suspension 5 (FIG. 1) and (5a) have a resilient element 13 (FIG. 2) comprising a spring and a shock absorber (not shown), located on the unsprung mass 4. The resilient element 13 is connected to the end 15 of the arm 7 by means of a flexible element 14, such as a cable. A chain or other suitable means can be used for the flexible element.

The location of the resilient element 13 on the sprung mass 1 makes it possible to decrease the unsprung mass 4, to which half the mass of the resilient element is added in the designs known in the art, and permits decreasing the aerodynamic drag of the vehicle inasmuch as only the levers 6 and 7 are located in the space between the unsprung mass 4 and the sprung mass 1.

This construction of the front suspension 5 gives a further advantage in that the installation and removal of the resilient element 13 for repairs and servicing are substantially simplified as these operations do not necessitate disassembling the articulated joints 8, 9, 10, 11 of the front suspension 5.

In another embodiment of the suspension, the flexible element 14 (FIG. 3) is connected direct to the unsprung mass 4, preferably near the articulated joint 8 which secures the upper arm 6 to the unsprung mass 4. This manner of connecting the flexible element relieves the arm 7 of the bending force, thereby enabling the unsprung mass 4 to be decreased by virtue of decreasing the mass of the arms 6 and 7. Also, connecting the flexible element 14 direct to the unsprung mass 4 provides for a more uniform loading of the articulated joints 8, 9, 10, 11 by relieving them of the vertical load.

The resilient element 13 (FIG. 4) mounted on the sprung mass 1 is connected to the unsprung mass 4 by means of said flexible element 14 which passes through a device 16 designed to vary the direction of the flexible element 14 and through a device 17 designed to vary the magnitude of the stress in the flexible element 14. The devices 16 and 17 are mounted separately on the sprung mass 1 to provide for varying the direction and magnitude of the stress in the flexible element 14 and may be of any construction known in the art and suitable for the purpose.

For compactness, it is expedient to make a combination of the device 16 for varying the direction of the flexible element 14 and the device 17 for varying the stress in the flexible element 14. One of such combination device is shown in FIG. 5 and it takes, for example, the form of a bellcrank lever 18 having arms of different length and it is mounted on the sprung mass 1 by means of a pivot 19. With this construction, the flexible element 14 is divided into two pieces and the ends of said pieces at the division point are connected to the arms of the bellcrank lever 18.

Referring to FIG. 6, the device for varying the direction and magnitude of the stress in the flexible element is made in the form of an appropriately contoured roller 20 installed on the sprung mass 1 by the use of the pivot 19 on which said roller is mounted eccentrically and rotatably. The flexible element 14 varies its direction by running over the roller 20. Variation of the stress is effected by choosing the contour of the roller 20.

Other means suitable for the purpose can also be used as devices for varying the direction and magnitude of the stress in the flexible element.

By changing the position of the roller 20 with respect to flexible element 14 or by changing the effective length of the arms of the bellcrank lever 18 (FIG. 5), we can obtain the desired ratio between the force transmitted from the unsprung mass 4 and the force causing deformation of the resilient element 13 and thereby we can obtain any characteristics of the rate of the suspension irrespective of the characteristic of the resilient element 13. Thus, the suspension can have the desired non-linear characteristics while using a resilient element with a linear characteristic. Furthermore, by acting upon the device 18 or 20 the driver can at will change the characteristic of the suspension 5, 5a to suit variation in the vehicle mass and travel conditions.

The employment of a combination device 18 or 20 makes it possible to locate the resilient elements 13 of the suspension in any convenient place on the vehicle, said resilient elements being arranged in one unit 21 in close proximity to one another. The arrangement of the resilient elements 13 in one unit 21 mounted on the sprung mass 1 simplifies repair and service operations and facilitates installation and removal of the resilient elements 13 (FIG. 4). Besides, the arrangement of the resilient elements 13 in one unit 21 (FIG. 1) facilitates adjustment of the resilient elements 13.

Figure 7:
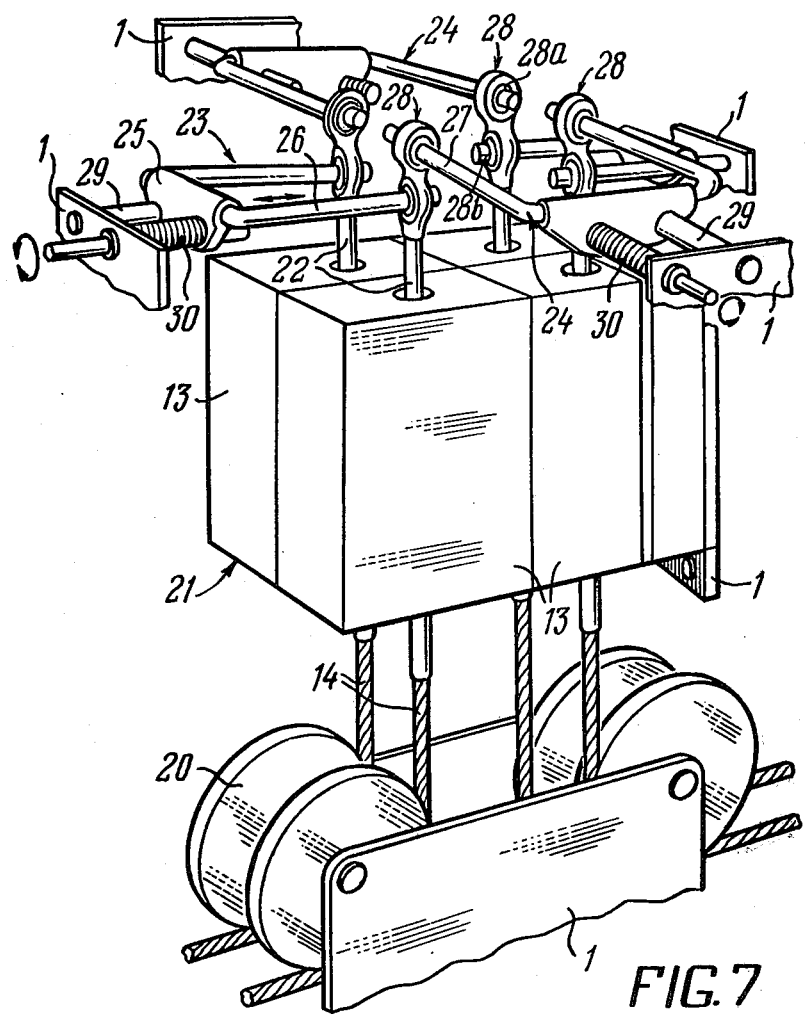
FIG. 7 is a perspective view showing a unit arrangement of the resilient elements with roll and pitch stabilizers.

The ends 22 (FIG. 7) of the resilient element 13 pertaining to the coaxial suspensions 5 and (5a) of the unsprung masses 4 (FIG. 1) are interconnected in pairs by roll stabilizers 23 (FIG. 7). The ends 22 of the resilient elements 13 pertaining to the suspensions 5 (FIG. 1) and 5a located on the same (right, left) side of the vehicle are interconnected in pairs by pitch stabilizers 24 (FIG. 7). The stabilizers 23 and 24 are movably mounted in supports 25 on the sprung mass 1. The arms 26,27 of the stabilizers 23,24 respectively are connected to the ends of the resilient elements 13 by means of articulations 28, each of which has two ball joints 28a and 28b which in turn are also adapted to permit axial movement of the arms 26, 27.

The support 25 of each stabilizer 23 (24) can be moved together with its particular stabilizer on the sprung mass 1 by means of a guide 29 and a screw mechanism 30 or any like mechanism operated by hand or by a mechanical (electrical, hydraulic) drive.

This construction, wherein the stabilizers 23,24 are in direct interaction with the resilient element 13, provides for further decreasing the unsprung masses 4 (FIG. 7) by virtue of the stabilizers 23 (FIG. 7), 24 not being connected thereto. The arrangement of the resilient elements 13 in close proximity to one another permits substantially decreasing the size and mass of the stabilizers 23, 24, thereby decreasing the total weight of the vehicle. Also, by decreasing the weight of the vehicle or sprung mass 1 which, with said construction of the stabilizers 23,24 and their supports 25, is not subjected to torsional stresses and, therefore, same can have less torsional rigidity and, consequently, less weight. By moving the supports 25 we can vary the length of the arms 26,27 of the stabilizers 23, 24, thereby varying the roll and pitch rates of the suspensions 5 (FIG. 1) and 5a. This, in turn, permits choosing the optimum rate of the suspension to suit any variation in the vehicle mass (depending upon the load and fuel consumption) and in the travel conditions.

Figure 8:
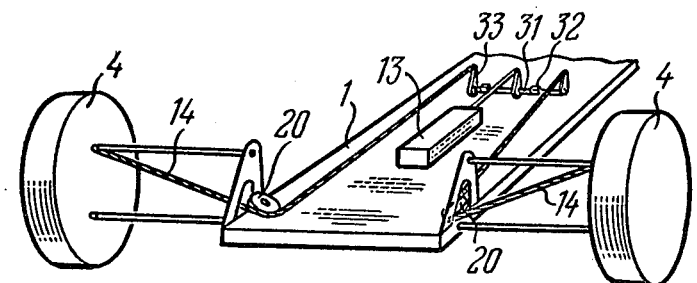
FIG. 8 is a fragmentary, diagrammatic view of a suspension of two coaxial unsprung masses having a common resilient element.

In one of the embodiments of the suspension, one of the resilient element 13 (FIG. 8) is mounted on the sprung mass 1 and is connected to two unsprung masses 4. For the purpose a roll stabilizer 31 is mounted in supports 32 on the sprung mass 1 and has an additional arm 33 connected to the resilient element 13. The flexible elements 14 are connected to said resilient element 13, passed over the contoured rollers 20 mounted on the sprung mass 1 and attached to the unsprung masses 4. This design permits decreasing the quantity of the resilient elements 13 and thereby simplifying the construction of vehicles which are not called upon to meet high suspension requirements.

Figure 9:
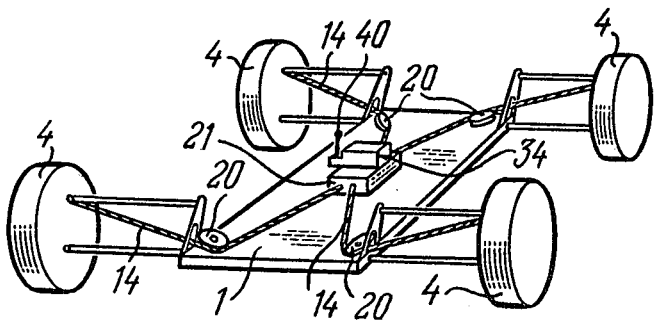
FIG. 9 is another diagrammatic view of a vehicle chassis whose suspension has a system for controlling the relative positions of the sprung and unsprung masses.

In order to improve the characteristics of the vehicle, a steering or control system 34 (FIG. 9) is mounted on the sprung mass 1, which system is designed for controlling the relative positions of the sprung mass 1 and the unsprung masses 4 and it is installed together with the unit 21 of the resilient elements 13 (FIG. 3). The system comprises pickups 35 (FIG. 10) for sensing the relative positions of the sprung and unsprung masses, a unit 36 for amplifying and converting signals from the pickups 35, a drive 37, a servomechanism 38, and a manual master control unit 39 with a control handle 40 (FIG. 9). The outputs of the relative position pickups 35 (FIG. 10) are connected to the inputs of the amplifying and converting unit 36. The output of the manual master control unit 39 is connected to the appropriate input of the amplifying and converting unit 36. The input of the drive 37 is connected to the output of the amplifying and converting unit 36, whereas the output of the drive 37 is connected to the input of the servomechanism 38. The employment of the system for controlling the relative positions of the sprung mass 1 and the unsprung masses 4 provides for maintaining the preset ground clearance irrespective of any variation in the vehicle mass and aerodynamic load, which materially improves the riding qualities of the vehicle and its adaptability to various road conditions.

The pickups 35, amplifying and converting unit 36, drive 37 and manual master control unit 39 may be of any suitable design known in the art.

Figure 11:
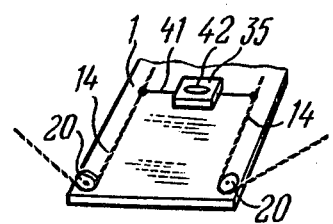
FIG. 11 is a fragmentary view of the sprung mass on which is mounted a pickup for sensing the relative positions of the sprung and unsprung masses.

The pickup 35 (FIG. 11) can be constructed in the form of a translational motion pickup with the stationary part thereof attached to the sprung mass 1 and the movable part (not shown) connected through links 41 to the flexible elements 14 of the coaxial unsprung masses 4 (front and rear wheels of the vehicle). The pickup for sensing the relative positions of the sprung mass 1 and the unsprung masses 4 may be embodied in any other constructional form.

Figure 10:
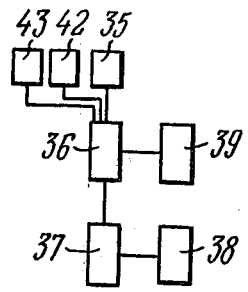
FIG. 10 is a block diagram of the system for controlling the relative positions of the sprung and unsprung masses.

To register roll and pitch and control, the relative positions of the sprung mass 1 and the unsprung masses 4 according to the roll and pitch, the control or steering system 34 (FIG. 9) includes a roll pickup 42 (FIG. 10) and a pitch pickup 43, and said pickups are mounted on the sprung mass 1 (FIG. 9). The outputs of pickups 42,43 (FIG. 10) are connected to the inputs of the amplifying and converting unit 36 (FIG. 10). Pickups 42,43 can be constructed in the form of angular motion pickups mounted on the sprung mass 1. The roll pickup 42 is installed in the same housing as the relative position pickups 35 (FIG. 11) or it may be of another, say gyroscopic, design.

The employment of the roll and pitch pickups 42,43 (FIG. 10) in the system for controlling the relative positions of the sprung and unsprung masses makes it possible to exclude mechanical pitch and roll stabilizers, thereby decreasing the mass of the vehicle. By using the manual master control unit, the driver can vary the characteristics of the suspension rate in pitching and rolling as is necessary to suit the various travel conditions encountered.

The vehicle suspension operates as follows:

During travel of the vehicle, unsprung masses 4 oscillate relative to the sprung mass 1. On the upward stroke of the unsprung mass 4, the flexible element 14 tightens and causes deformation of the resilient element 13 which resists the movement of the unsprung mass 4 and tends to return it into the initial position. The oscillations of the unsprung mass 4 are damped out by the shock absorber (not shown) which is a component of the resilient element 13.

During oscillation of the unsprung masses 4 the movement of the flexible element 14 is not large. Therefore, the device for varying the direction and magnitude of the stress in the flexible element 14, which is constructed in the form of the bellcrank lever 18 (roller 20), turns through a small angle. Variation in the rate of the suspension 5 (5a) is effected by choosing the appropriate ratio between the arms of the bellcrank lever 18 (or by turning the roller 20) with respect to the flexible element 14. A substantial variation in the rate of the suspension can be obtained by choosing the appropriate configuration of the roller 20 or the bellcrank lever 18. This renders the characteristics of the suspensions 5 (5a) practically independent of the characteristics of the resilient element 13 and provides for using most economical and freely available elements (for example, rubber blocks in combination with a hydraulic shock absorber). A further advantage is that the characteristic of the suspension can be adjusted, both preliminarily and while in motion, so that in the latter case it can be suited to the varying conditions of travel. For such purpose, the driver operates the mechanism for turning the roller 20. This mechanism (not shown) is not an object of the invention and may be of a mechanical, electrical or of any other suitable means. The sprung mass is stabilized in rolling and pitching by the roll and pitch stabilizers 23,24. Rolling or pitching gives rise to a large relative movement of one of the flexible elements 14 which are connected in pairs to the stabilizers 23,24. The stabilizer connection becomes subjected to torsion and loads the resilient element 13 connected to the other flexible element 14, thereby increasing the resistance to the movement of the unsprung mass 4 which has caused the rolling or pitching involved. In this way, the vehicle is stabilized in roll and pitch caused by side and longitudinal inertia forces in cornering, accelerating, braking and travelling on an uneven road. As the mass of the vehicle varies with a change in the amount of the fuel in the tank, the number of passengers and the weight of the load, the suspension rate in rolling and pitching has to be varied so as to obtain the best riding characteristics. For this purpose, the driver operates the screw mechanism 30 in order to move the supports 25 of the relevant stabilizers. The movement of the supports 25 causes the arms 26 (27) of the stabilizers 23 (24) to move in the ball joints 28a, 28b, whereby the effective length of the arms 26, 27 of the stabilizers 23,24 is changed, causing variation in the relationship between the torsional movement of the stabilizer 23 (24) and the deformation of the resilient elements 13 connected thereto, due to a change which takes place in the suspension rate in rolling or pitching, as the case may be. To set the optimum ground clearance for the given travel, road and load conditions, the driver operates the control handle 40 (FIG. 9) of the manual master control unit 39 incorporated in the steering system 34 for controlling the relative positions of the sprung mass 1 and the unsprung masses 4. The signal from the manual master control unit 39 is converted and amplified by the amplifying and converting unit 36 and is fed into the drive 37 to actuate it. The servomechanism 38, which is connected to the drive 37, operates the respective resilient elements 13 arranged in the unit 21, thereby tightening or loosening the flexible elements 14 as necessary to obtain the required position of the sprung mass 1. During travel, deviations of the sprung mass 1 from the initial preset position are registered by the relative position pickups 35. The signal from the pickups 35 is amplified and converted by the unit 36 and is sent out to actuate the drive 37 and the servomechanism 38 and the latter operates the resilient element unit 21, whereby the sprung mass 1 is levelled up. Roll and pitch stabilization is effected by the control system 34 with the aid of the roll and pitch pickups which generate a signal proportional to the roll or pitch, as the case may be, and fed it into the amplifying and converting unit 36. As described earlier, the signal emitted by the amplifying and converting unit 36 actuates the drive 37 and the servomechanism 38 and the latter operates the resilient elements 13 arranged in the unit 21, whereby the sprung mass 1 is levelled up. The rate of the suspension in rolling and pitching is set by the driver by operating the control handle 40 of the manual master control unit, thereby controlling the amplification of the roll and pitch pickup signals by the unit 36.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A transport vehicle comprising a sprung mass and unsprung masses, suspensions coupling said mass through said unsprung masses so that said unsprung masses can move independently in a vertical direction with respect to said sprung mass over a predetermined range between limits on said sprung mass; each of said suspensions comprising a resilient element and arms, the ends of which are hingedly connected to an unsprung mass while their other ends are connected to said sprung mass and are capable of moving in a vertical direction over a limited range; said resilient elements located on said sprung mass in a unit for said resilient elements arranged on said sprung mass; and a plurality of flexible elements, each coupling one of said resilient elements with an unsprung mass; and said flexible elements being under tension over the entire range of the vertical movement of an unsprung mass with respect to said sprung mass due to a pretightening or preloading of the resilient elements.

2. A vehicle as claimed in claim 1, wherein one end of a flexible element is connected to an associated resilient element and the other end thereof is connected to one of a pair of upper and lower suspension arms supporting each said unsprung mass.

3. A vehicle as claimed in claim 1, wherein one end of said flexible element is connected to an unsprung mass and the other end thereof is connected to an associated resilient element.

4. A vehicle as claimed in claim 14, wherein between the unsprung mass and a resilient element a device is arranged for varying the direction and magnitude of the stress in the flexible element, and said device is adapted for interacting with the said flexible element and is mounted on the sprung mass.

5. A vehicle as claimed in claim 4, wherein the device for varying the direction and magnitude of the stress in the flexible element is constructed in the form of a bellcrank lever with arms of different length and said flexible element is divided into two pieces, with the ends of the flexible element pieces at the point of division connected to the arms of the bellcrank lever.

6. A vehicle as claimed in claim 4, wherein the device for varying the direction and magnitude of the stress in the flexible element is constructed in the form of an appropriately contoured roller arranged for said flexible element to run over it and said roller being eccentrically pivoted on the sprung mass.

7. A vehicle as claimed in claim 1, wherein said resilient elements of the suspensions are arranged close to one another in, unit mounted on the sprung mass.

8. A vehicle as claimed in claim 1, including a roll stabilizer mounted on the sprung mass and constructed in the form of a torsion bar having two arms positioned at an angle thereto, and the ends of said torsion bar arms being connected to the resilient elements of the suspensions carrying coaxial unsprung masses.

9. A vehicle as claimed in claim 1, including a pitch stabilizer mounted on the sprung mass and constructed in the form of a torsion bar having arms positioned at an angle thereto, and the ends of said torsion bar arms being connected to the resilient elements of the suspensions situated on the same side of the vehicle.

10. A vehicle as claimed in claim 1, wherein at least one of the resilient elements is a common element for at least two unsprung masses connected thereto through flexible elements, so as to decrease the number of said resilient elements and simplify the construction of said transport vehicle.

11. In a transport vehicle having sprung and pairs of coaxial unsprung masses, and having a suspension of each of said unsprung masses comprising: arms articulated at one end to an unsprung mass of said unsprung masses and at the other end to said sprung mass so that said unsprung masses can move independently in a vertical direction with respect to said sprung mass over a predetermined range between limits on said sprung mass; resilient elements located on said sprung mass; a plurality of flexible elements, each flexible element connecting one of said resilient elements to an unsprung mass of said unsprung masses; a device for varying the direction and magnitude of the stress in the flexible elements, said device being mounted on said sprung mass between said resilient elements and the unsprung mass of said unsprung masses and arranged to interact with said flexible elements; said flexible elements being under stress over the range of the vertical displacement of an unsprung mass of said unsprung masses relative to said sprung mass due to the precompression of said resilient elements, and said resilient elements arranged close to one another in a common unit mounted on said sprung mass for housing said resilient elements; and a system for controlling the relative positions of the sprung and unsprung masses mounted on said sprung mass and comprising roll, pitch and position pickups, the latter of which is used for sensing the relative positions of the sprung and unsprung masses, a unit for amplifying and converting signals received from said roll, pitch and position pickups, the units of said unit being connected to the outputs of said pickups, a manual master control unit having its output connected to the appropriate input of said amplifying and converting unit, a drive whose input is connected to the output of the amplifying and converting unit, a servomechanism interacting with said resilient elements, and the input of said servomechanism being connected to the output of said drive.

12. A vehicle as claimed in claim 11, wherein each pair of the coaxial unsprung masses is provided with a common pickup for sensing the relative positions of the sprung and unsprung masses, and said pickup is connected to the flexible elements connecting said unsprung masses to the resilient elements.

13. A vehicle as claimed in claim 11, wherein the system for controlling the relative positions of the sprung and unsprung masses comprises roll and pitch pickups mounted on the sprung mass, and the outputs of said pickups being connected to the inputs of the unit amplifying and converting signals from the pickups sensing the relative positions of the sprung and unsprung masses.

* * * * *